United States Patent
Wu et al.

(10) Patent No.: US 11,456,895 B2
(45) Date of Patent: Sep. 27, 2022

(54) CHANNEL ESTIMATION METHOD

(71) Applicant: REALTEK SEMICONDUCTOR CORPORATION, Hsinchu (TW)

(72) Inventors: Tsung-Chen Wu, Hsinchu (TW); Chia-Min Li, Hsinchu (TW); Liang-Wei Huang, Hsinchu (TW); Shih-Hsiung Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/359,612

(22) Filed: Jun. 27, 2021

(65) Prior Publication Data

US 2022/0271976 A1    Aug. 25, 2022

(30) Foreign Application Priority Data

Feb. 20, 2021   (TW) .................................. 110105929

(51) Int. Cl.
    *H04L 25/02* (2006.01)
(52) U.S. Cl.
    CPC ................ *H04L 25/0202* (2013.01)
(58) Field of Classification Search
    CPC .................................................. H04L 25/0202
    See application file for complete search history.

(56) References Cited

U.S. PATENT DOCUMENTS

| | | | | |
|---|---|---|---|---|
| 6,480,532 B1* | 11/2002 | Vareljian | ................ | H04B 3/23 375/220 |
| 2002/0064284 A1* | 5/2002 | Takagi | ................ | G10L 19/18 704/E19.041 |
| 2004/0013208 A1* | 1/2004 | Bui | ................ | H04L 1/24 375/232 |
| 2016/0226533 A1* | 8/2016 | Wei | ................ | H04L 25/0212 |

FOREIGN PATENT DOCUMENTS

TW    I220611 B    8/2004

OTHER PUBLICATIONS

English Abstract of TWI220611B.

* cited by examiner

*Primary Examiner* — Hsinchun Liao
(74) *Attorney, Agent, or Firm* — WPAT, P.C., Intellectual Property Attorneys; Anthony King

(57) ABSTRACT

A channel estimation method is configured to estimate a channel length. The method includes the following operations: receiving an input signal; summing the input signal and an analog echo cancelation signal decrease an echo of the input signal, and generate a first signal according to a result of the summation; providing an analog gain value to the first signal to generate a second signal; performing an analog-to-digital conversion to the second signal to generate a third signal; obtaining a ratio according to an energy of a first frequency and an energy of a second frequency of the third signal; and estimating the channel length according to the ratio, and setting the analog gain value according to the estimated channel length.

20 Claims, 2 Drawing Sheets

CHANNEL ESTIMATION METHOD

CROSS-REFERENCE TO RELATED APPLICATIONS

This application claims the benefit of priority to Patent Application 110105929, filed in Taiwan on Feb. 20, 2021, which is incorporated by reference in its entirety.

TECHNICAL FIELD

The present disclosure is related to an estimation method; in particular, to a channel estimation method considering echo and crosstalk.

BACKGROUND

In Ethernet systems, channel estimation is generally performed at the early stage of data transmission, and the initial configuration of the Ethernet system is based on the channel estimation results, such as determining the default parameters of the gain controller or equalizer to improve performance. Therefore, the accuracy of channel estimation is considered one of the most critical issues to be solved in this field.

SUMMARY OF THE INVENTION

An aspect of the present disclosure provide a channel estimation method configured to estimate a channel length of a channel. The channel estimation method includes the operations of: receiving an input signal from the channel; summing the input signal and an analog echo cancelation signal to decrease an echo in the input signal, and generating a first signal according to a summation result; providing an analog gain value onto the first signal to generate a second signal; performing an analog-to-digital conversion to the second signal to generate a third signal; obtaining a ratio of an energy of a first frequency of the third signal to an energy of a second frequency of the third signal; and estimating the channel length according to the ratio, and setting the analog gain value according to the estimated channel length.

Another aspect of the present disclosure provide a channel estimation method configured to estimate a channel length of a channel. The channel estimation method includes the operations of: receiving an input signal from the channel; performing an analog-to-digital conversion to generate a first digital signal according to the input signal; summing the first digital signal and a digital echo cancellation signal, and generating a second digital signal according to a summation result; obtaining a ratio of an energy of a first frequency of the second digital signal and an energy of a second frequency of the second digital signal; and estimating the channel length according to the ratio.

The channel estimation method of the present disclosure considers the effects of the echo and crosstalk simultaneously. Compared with conventional technology, the present disclosure improves the estimation accuracy, thereby optimizing equalizers' operation.

BRIEF DESCRIPTION OF THE DRAWINGS

Aspects of the present disclosure are best understood from the following detailed description when read with the accompanying drawings. It is noted that, in accordance with the standard practice in the industry, various features are not drawn to scale. In fact, the dimensions of some features may be arbitrarily increased or reduced for clarity of discussion.

DETAILED DESCRIPTION

Figure 1:
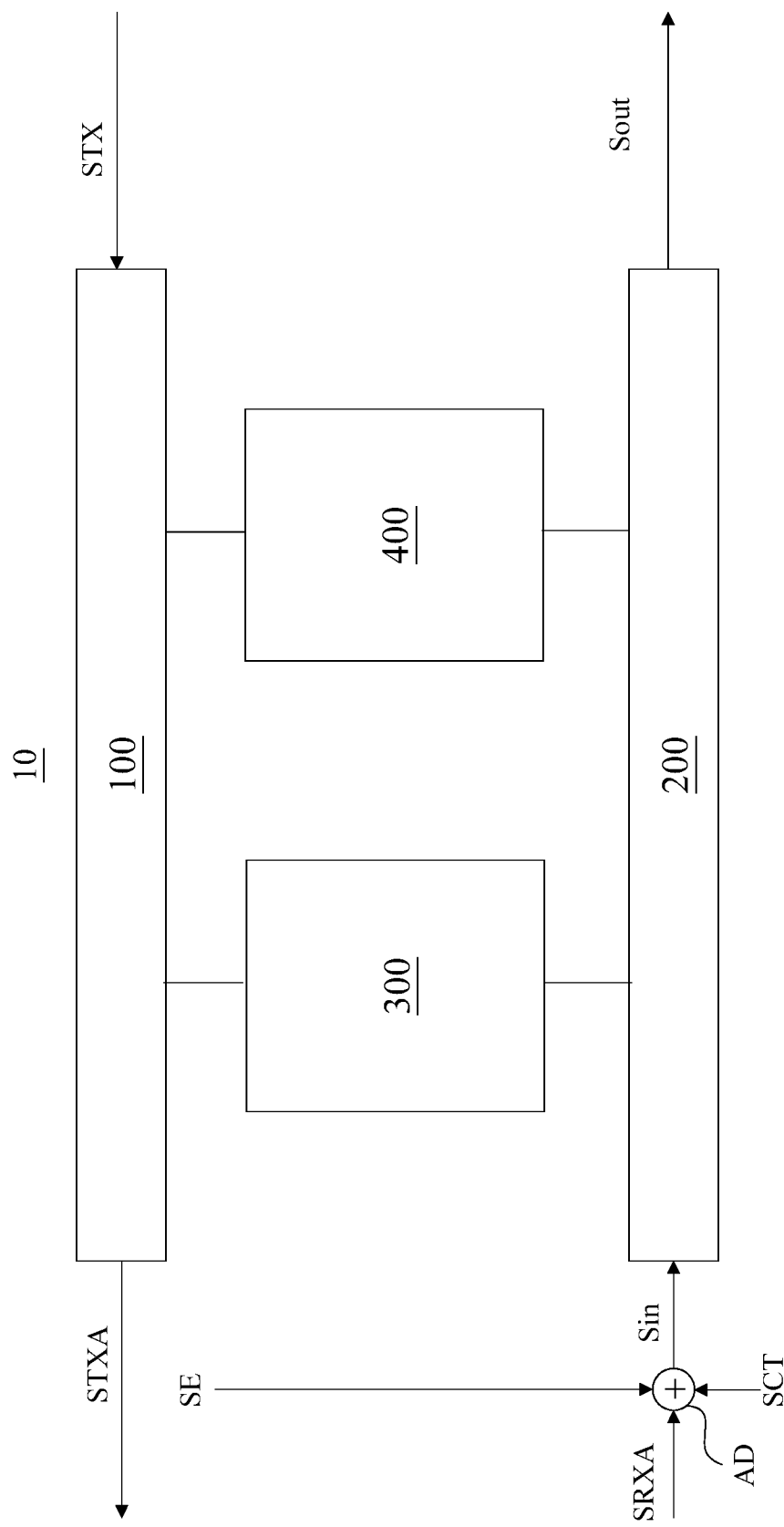
FIG. 1 is a schematic diagram illustrating a transmission system according to some embodiments of the present disclosure.

FIG. 1 is a schematic diagram illustrating a transmission system 10 according to some embodiments of the present disclosure. The transmission system 10 includes a transmitting circuit 100, a receiving circuit 200, an analog cancellation circuit 300, and a digital cancellation circuit 400. The transmission system implements the full-duplex technology, and the transmitting circuit 100 is configured to output a transmission signal STX received from the baseband circuit (not shown) as an analog output signal STXA, and transmit the same to another transmission system (not shown) via a channel. The receiving circuit 200 is configured to receive an input signal Sin from said another transmission system via the channel, and generate an output signal Sout to the baseband circuit. For example, the transmission system 10 sends and receives signals using a channel with two transmission lines (not shown), wherein the first transmission line is coupled to the transmitting circuit 100 and configured to transmit the analog output signal STXA, wherein the second transmission line is coupled to the receiving circuit 200 and configured to transmit the analog input signal SRXA. In some embodiments, the transmission system 10 is applicable to the Ethernet system.

When there is an impedance mismatch of the transmission lines or a mismatch condition in the hybrid architecture of the transmission system 10, the analog output signal STXA will leak back to the receiving circuit 200 as an echo SE. In other words, the echo SE is associated with the analog output signal STXA; i.e., with the transmission signal STX. In some embodiments, the transmission system 10 may include multiple transmitting circuits 100 and multiple receiving circuits 200, each set of the transmitting circuit 100 and the receiving circuit 200 has its own channel. When adjacent channels (e.g., channels of another set of transmitting/receiving circuits adjacent to the transmitting circuit 100 and the receiving circuit 200 shown in FIG. 1) have signals transmitted thereon, the signals on the adjacent channels are coupled to the analog input signal SRXA in a crosstalk SCT manner. As shown in FIG. 1, if the signal coupling condition in the above-mentioned channel is equivalent to a virtual circuit, it can be understood that the echo SE and the crosstalk SCT are summed with the analog input signal SRXA through the virtual adder AD to generate the input signal Sin. In other words, the input signal Sin received by the receiving circuit 200 includes the analog input signal SRXA, the echo SE, and the crosstalk SCT.

In the receiving circuit 200, the input signal Sin undergoes a process of gain adjustment, analog-to-digital conversion, and equalization to generate the output signal Sout. The receiving circuit 200 is configured to calculate the loss caused by the channel to the signal according to the input signal Sin to estimate the channel length, and to adjust the default parameters of gain adjustment and equalization in the receiving circuit 200 according to the estimated channel length. When the channel length is estimated accurately, the obtained default parameters allow the receiving circuit 200 to have better receiving capabilities. However, when the echo SE and the crosstalk SCT increase, it is equivalent to the increase of the noise in the input signal Sin. In other words, when the echo SE and the crosstalk SCT increase, the signal to noise ratio (SNR) of the input signal Sin decreases, resulting in a decrease in the accuracy of the channel length estimation by the receiving circuit 200, and hence, a deviation from the optimal operation of gain adjustment and equalization and a decrease in the receiving capability of the receiver circuit 200.

Therefore, the transmission system 10 uses the analog cancellation circuit 300 and the digital cancellation circuit 400 to decrease the echo SE and crosstalk SCT component in the input signal Sin when the receiving circuit 200 is performing the channel estimation operation, so as to increase the accuracy of channel length estimation and improve the performance of the receiving circuit 200.

In some embodiments, the transmission system 10 only includes the analog cancellation circuit 300. In some other embodiments, the transmission system 10 only includes the digital cancellation circuit 400.

Figure 2:
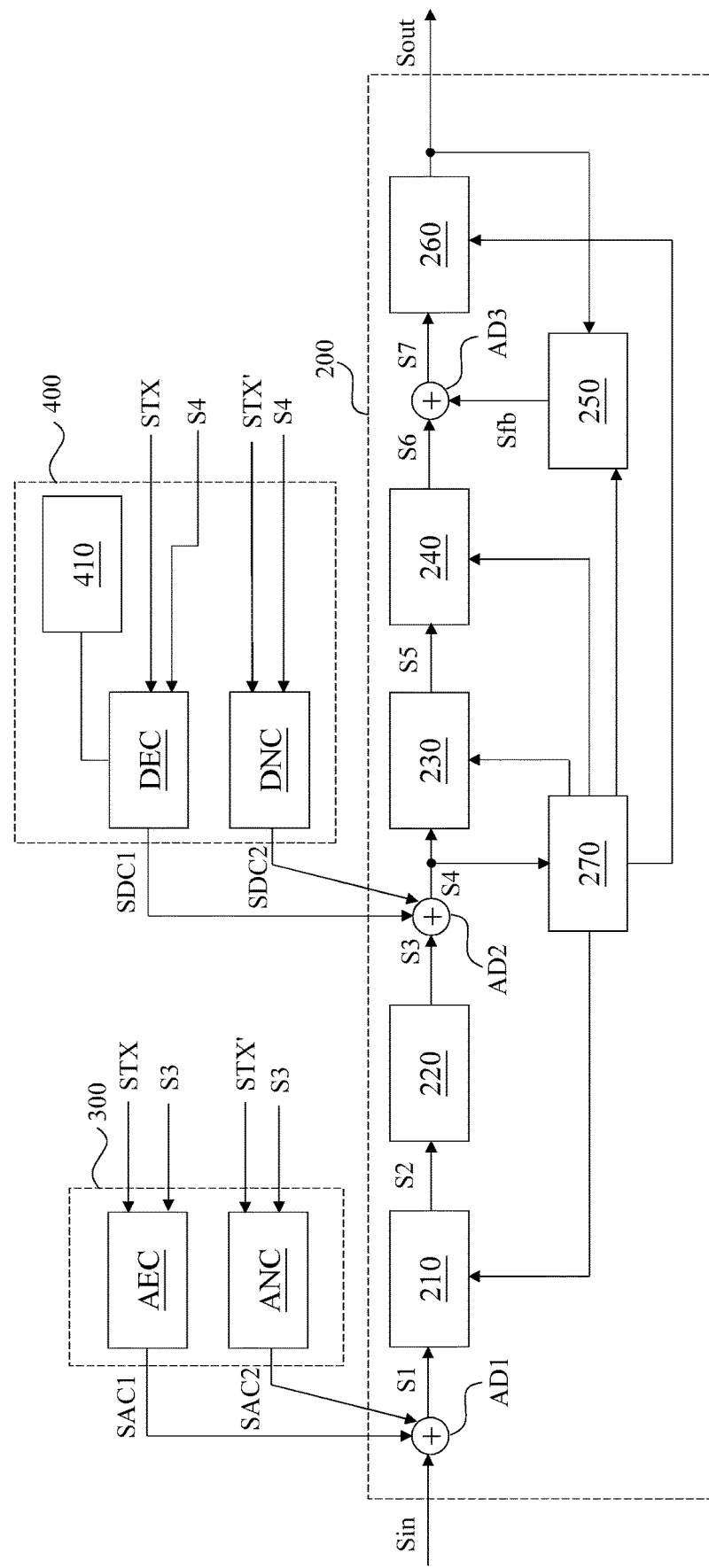
FIG. 2 is a schematic diagram illustrating the detail of a part of the transmission system according to some embodiments of the present disclosure.

Reference is made to FIG. 2. FIG. 2 is a schematic diagram illustrating details of the receiving circuit 200, the analog cancellation circuit 300, and the digital cancellation circuit 400. The analog cancellation circuit 300 is configured to generate an analog echo cancelation signal SAC1 and an analog crosstalk cancelation signal SAC2, and the digital cancellation circuit 400 is configured to generate a digital echo cancellation signal SDC1 and a digital crosstalk cancellation signal SDC2. The receiving circuit 200 is configured to receive the analog echo cancelation signal SAC1, the analog crosstalk cancelation signal SAC2, the digital echo cancellation signal SDC1, and the digital crosstalk cancellation signal SDC2, thereby decreasing the echo SE and crosstalk SCT component of the signal in the receiving circuit 200.

The receiving circuit 200 includes an adder AD1, an analog gain controller 210, an analog-to-digital converter (ADC) 220, an adder AD2, an equalizer 230, a digital gain controller 240, an adder AD3, an equalizer 250, a decision unit 260, and a channel estimation circuit 270. In the present embodiment, the equalizer 230 is a forward-feeding equalizer, the equalizer 250 is a decision-returning equalizer, and the decision unit 260 is a slicer.

During the channel estimation operation before the normal operation, the channel estimation circuit 270 is configured to calculate the loss of the signal in the channel based on the signal S4, and to estimate the channel length accordingly. The channel estimation circuit 270 then controls the default parameters of the equalizer 230 and the equalizer 250 when entering the general operation according to the channel length (e.g., a plurality of equalizer coefficients of the equalizer 230 and the equalizer 250 can be set by performing lookup operations based on a pre-built lookup table), and adjusts the analog gain value AG of the analog gain controller 210 in the normal operation and the digital gain value DG of the digital gain controller 240 in the normal operation (e.g., these gain values can be set by performing lookup operations based on a pre-built lookup table).

During the normal operation after the channel estimation operation, after the receiving circuit 200 receives the input signal Sin, the adder AD1 is used to sum the input signal Sin, the analog echo cancelation signal SAC1, and the analog crosstalk cancelation signal SAC2 to generate the signal S1. Compared with the input signal Sin, the signal S1 includes less echo SE and the crosstalk SCT. The analog gain controller 210 provides an analog gain value AG to the signal S1 to generate a signal S2. The ADC 220 converts the signal S2 into a signal S3, and the adder AD2 is used to sum the signal S3, the digital echo cancellation signal SDC1, and the digital crosstalk cancellation signal SDC2 to generate the signal S4. Compared with the signal S3, the signal S4 includes less echo SE and crosstalk SCT components. The equalizer 230 equalizes the signal S4 into a signal S5 using multiple equalizers of its own. The digital gain controller 240 provides a digital gain value DG to the signal S5 to generate the signal S6. The adder AD3 sums the signal S6 and a return signal Sfb to obtain the signal S7, the decision unit 260 generates an output signal Sout according to the signal S7, and then the equalizer 250 equalizes the output signal Sout to generate the return signal Sfb back to the adder AD3 using multiple equalizers of its own.

The analog cancellation circuit 300 includes an analog echo cancelation circuit AEC and an analog crosstalk cancelation circuit ANC. The analog echo cancelation circuit AEC is configured to generate the analog echo cancelation signal SAC1 according to the transmission signal STX and the signal S3, and the analog crosstalk cancelation circuit ANC is configured to generate the analog crosstalk cancelation signal SAC2 according to the transmission signal STX' of another transmitting circuit (transmitting circuit having the adjacent channel of the above-mentioned transmission system 10) and the signal S3. The digital cancellation circuit 400 includes a digital echo cancellation circuit DEC and a digital crosstalk cancellation circuit DNC. The digital echo cancellation circuit DEC is configured to generate the digital echo cancellation signal SDC1 according to the transmission signal STX and the signal S4, and the digital crosstalk cancellation circuit DNC is configured to generate the digital crosstalk cancellation signal SDC2 according to the transmission signal STX' of another transmitting circuit and the signal S4. In some embodiments, the analog echo cancelation circuit AEC, the analog crosstalk cancelation circuit ANC, the digital echo cancellation circuit DEC, and the digital crosstalk cancellation circuit DNC are implemented using a finite pulse response filter. The digital cancellation circuit 400 further includes a coefficient controller 410, configured to control the filtering coefficients of the digital echo cancellation circuit DEC and the filtering coefficients of the digital crosstalk cancellation circuit DNC. It is noted that these are merely examples and are not used to limit the present disclosure. In some embodiments, the analog echo cancelation circuit AEC may generate the analog echo cancelation signal SAC1 according to the transmission signal STX and the signal S6, and the analog crosstalk cancelation circuit ANC may generate the analog crosstalk cancelation signal SAC2 according to the transmission signal STX' of another transmitting circuit and the signal S6. Correspondingly, the digital echo cancellation circuit DEC may generate the digital echo cancellation signal SDC1 according to the transmission signal STX and the signal S7, and the digital crosstalk cancellation circuit DNC may generate the digital crosstalk cancellation signal SDC2 according to the transmission signal STX' of another transmitting circuit and the signal S7.

During channel estimation operation, since all of the equalizer 230, the equalizer 250, and a clock and data recovery (CDR) circuit (not shown in the figure) are not activated, the ADC 220, the analog cancellation circuit 300, and the digital cancellation circuit 400 operates under a fixed phase. The signals S3 that the ADC 220 sampled in different phases may vary, and the cancellation signals that the analog cancellation circuit 300 and the digital cancellation circuit 400 obtained in different phases may also vary, and thus, the signals S4 obtained in each phase differ from one another. To improve the accuracy, the channel estimation circuit 270 of the present disclosure performs a channel estimation operation for all phases that the receiving circuit 200 can provide and then average the multiple estimated channel lengths, and then control the analog gain controller 210, the equalizer 230, the digital gain controller 240, and the equalizer 250 according to the averaged channel length.

Specifically, the ADC 220 performs the analog-to-digital conversion using multiple sampling phases so that the signals S3 that the analog cancellation circuit 300 generates in different sampling phases converge, and that the signals S4 that the digital cancellation circuit 400 generates in different sampling phases converge. More specifically, the ADC 220 first performs the analog-to-digital conversion to the signal S2 in the first sampling phase, the analog cancellation circuit 300 generates the analog echo cancelation signal SAC1 and the analog crosstalk cancelation signal SAC2 according to the signal S3 generated in the first sampling phase, and the digital cancellation circuit 400 generates the digital echo cancellation signal SDC1 and the digital crosstalk cancellation signal SDC2 according to the signal S4 generated in the first sampling phase. Meanwhile, the channel estimation circuit 270 estimates the channel length according to the signal S4 generated in the first sampling phase. Next, the ADC 220 switches to a second sampling phase different from the first sampling phase and performs the analog-to-digital conversion to the signal S2, and the analog cancellation circuit 300 and the digital cancellation circuit 400 respectively operate according to the signal S3 and the signal S4 generated in the second sampling phase. Meanwhile, the channel estimation circuit 270 estimates the channel length according to the signal S4 generated in the second sampling phase. After estimating the channel lengths corresponding to all the phases, the channel estimation circuit 270 may sum and average all the channel lengths in each sampling phase to obtain an averaged channel length and control the default parameters of the analog gain value controller 210, the digital gain controller 240, the equalizer 230, and the equalizer 250 during the normal operation according to the averaged channel length.

Compared with the conventional approaches, the transmission system 10 of the present disclosure, when performing the channel estimation operation, turns on the analog cancellation circuit 300 and part of the digital cancellation circuit 400 to generally reduce the effect of echo and crosstalk, so that a signal with less noise can be obtained. So that the analog-to-digital conversion operation may use a broader dynamic range and that the receiver circuit 200 may estimate the channel loss based on the signal with less noise to obtain a more accurate channel length. It also allows the receiver circuit 200 to predict the channel loss based on the signal with less noise to obtain a more accurate channel length. Specifically, because the equalizer 230 and equalizer 250 are not yet turned on during the channel estimation operation, theoretically, the digital echo cancellation circuit DEC and the digital crosstalk cancellation circuit DNC cannot operate properly. Nonetheless, in the present disclosure, the coefficient controller 410 uses only part of the filtering coefficients of the digital echo cancellation circuit DEC (i.e., the other part of the filtering coefficients is set to 0) to achieve the effect of roughly eliminating the echo and crosstalk. In the present embodiment, the coefficient controller 410 turns on only the main filter coefficients of the digital echo cancellation circuit DEC, and forcibly disables the rest of the filter coefficients, for example, by setting them to 0, wherein the main filter coefficients correspond to the place where the echo energy is stronger, specifically, if the echo energy is concentrated at the near end, the filter coefficient corresponding to the front part can be turned on accordingly. The coefficient controller 410 controls the digital crosstalk canceling circuit DNC in a similar manner.

In some embodiments, when estimating the channel length, the channel estimation circuit 270 receives the signal S4 (including the signal S4 generated at the first sampling phase and the signal S4 generated at the second sampling phase, as described previously) and extracts the energy E1 at the first frequency and the energy E2 at the second frequency of the signal S4. Next, the channel estimation circuit 270 takes the squared values E12 and E22 for each of energy E1 and energy E2, normalizes E12 and E22, and then divides them to obtain a ratio R. The channel estimation circuit 270 adjusts the operational parameters of the analog gain value AG, the digital gain value DG, and/or the equalizers 230, 250, and 270 according to the ratio R. For example, these gain values and operational parameters may be set by performing lookup operations based on a pre-built lookup table.

When the input signal Sin is continuously transmitted, the energy E1 and energy E2 in signal S4 are continuously updated over time. The channel estimation circuit 270 is also used to compare the updated energy squared value E12 with the energy squared value E22 and the ratio R. When the product of the updated energy squared value E22 and the ratio R is less than the updated energy squared value E12, the channel estimation circuit 270 uses the updated energy squared value E12 and the energy squared value E22 to update the ratio R. In some embodiments, only when the product of the updated energy squared value E22 and the ratio R is less than the updated energy squared value E12 by a predetermined number of times, will the channel estimation circuit 270 update the ratio R using the updated energy squared value E12 and the energy squared value E22.

Therefore, according to the above-mentioned embodiments, the channel estimation circuit 270 may calculate the ratio R based on the energy E1 at the first frequency and the energy E2 at the second frequency of the signal S4 in the first sampling phase, and may also calculate the ratio R based on the energy E1 at the first frequency and the energy E2 at the second frequency of the signal S4 in the second sampling phase, and then generate the corresponding channel lengths in the first sampling phase and the second sampling phase, respectively; lastly, the two channel lengths are summed and averaged to generate the estimated channel length. This example is based on two sampling phases and two frequencies and is not intended to limit the present disclosure.

In some embodiments, the transmission system 10 has a Baud rate of 125 MHz, the first frequency of the signal S4 is 1/X time of the Baud rate of the transmission system 10, and the second frequency of the signal S4 is 1/Y time of the Baud rate of the transmission system 10. In some embodiments, X and Y are respectively powers of 2, and X and Y are different. For example, the first frequency is 15.625 MHz, and the second frequency is 31.25 MHz.

What is claimed is:

1. A channel estimation method, configured to estimate a channel length of a channel, comprising:
   receiving an input signal from the channel;
   summing the input signal and an analog echo cancelation signal to decrease an echo in the input signal, and generating a first signal according to a summation result;
   providing an analog gain value to the first signal to generate a second signal;

performing an analog-to-digital conversion to the second signal to generate a third signal;

obtaining a ratio of an energy of a first frequency of the third signal to an energy of a second frequency of the third signal; and estimating the channel length according to the ratio, and setting the analog gain value according to the estimated channel length.

2. The channel estimation method of claim 1, further comprising:

generating the analog echo cancelation signal according to the third signal and a transmission signal, wherein the transmission signal is from a transmitting circuit connected to the channel; and generating an analog crosstalk cancelation signal according to the third signal and another transmission signal, wherein the another transmission signal is from an another transmitting circuit of an another channel adjacent to the channel, wherein the step of summing the input signal and the analog echo cancelation signal to decrease the echo of the input signal comprises summing the input signal, the analog echo cancelation signal, and the analog crosstalk cancelation signal in order to generate the first signal.

3. The channel estimation method of claim 1, further comprising:

generating a digital echo cancellation signal according to a transmission signal, wherein the transmission signal is from a transmitting circuit connected to the channel;

generating a digital crosstalk cancellation signal at least according to an another transmission signal, wherein the another transmission signal is from an another transmitting circuit of an another channel adjacent to the channel; and summing the third signal, the digital echo signal, and the digital crosstalk cancellation signal to decrease an echo in the third signal and a crosstalk in the third signal, and generating the summation result as a fourth signal, wherein the echo in the transmission signal and the input signal are related to the echo in the third signal.

4. The channel estimation method of claim 3, wherein the step of generating the digital echo cancellation signal according to the transmission signal comprises:

adjusting a plurality of filtering coefficients; and filtering the transmission signal according to the plurality of filtering coefficients to generate the digital echo cancellation signal.

5. The channel estimation method of claim 4, wherein in the step of adjusting the plurality of filtering coefficients, at least one filtering coefficient of the plurality of filtering coefficients is disabled.

6. The channel estimation method of claim 3, wherein the step of obtaining the ratio of the energy of the first frequency of the third signal to the energy of the second frequency of the third signal comprises:

summing the third signal, the digital echo signal, and the digital crosstalk cancellation signal to decrease the echo in the third signal and the crosstalk in the third signal, and after generating the summation result as the fourth signal, obtaining a square value of the energy of the first frequency of the fourth signal and a square value of the energy of the second frequency of the fourth signal; and obtaining the ratio according to the square value of the energy of the first frequency and the square value of the energy of the second frequency, wherein the first frequency and the second frequency are respectively 1/X time the Baud rate and 1/Y time the Baud rate on the channel, wherein X and Y are respectively powers of 2, and X and Y are different.

7. The channel estimation method of claim 1, further comprising:

using a plurality of first equalizer coefficients to equalize the fourth signal to generate a fifth signal;

providing a digital gain value to gain the fifth signal to generate a sixth signal;

summing the sixth signal and a return signal to generate a seventh signal;

using a decision unit to perform a determination on the seventh signal to generate an output signal; and setting the digital gain value according to the ratio.

8. The channel estimation method of claim 7, further comprising:

using a plurality of second equalizer coefficients to equalize the output signal to generate the return signal.

9. The channel estimation method of claim 8, further comprising:

setting the plurality of first equalizer coefficients and the plurality of second equalizer coefficients according to the ratio.

10. The channel estimation method of claim 1, wherein the step of performing the analog-to-digital conversion to the second signal to generate the third signal comprises:

performing the analog-to-digital conversion to the second signal in a first sampling phase to generate the third signal in the first sampling phase; and performing the analog-to-digital conversion to the second signal in a second sampling phase different from the first sampling phase to generate the third signal in the second sampling phase;

the step of obtaining the ratio of the energy of the first frequency of the third signal and the energy of the second frequency of the third signal comprises:

obtaining the ratio in the first sampling phase according to the energy of the first frequency of the third signal and the energy of the second frequency of the third signal in the first sampling phase; and obtaining the ratio in the second sampling phase according to the energy of the first frequency of the third signal and the energy of the second frequency of the third signal in the second sampling phase; and the step of estimating the channel length according to the ratio comprises:

estimating a first channel length according to the ratio in the first sampling phase;

estimating a second channel length according to the ratio in the second sampling phase; and summing and averaging the first channel length and the second channel length to generate the estimated channel length.

11. A channel estimation method, configured to estimate a channel length of a channel, comprising:

receiving an input signal from the channel;

performing an analog-to-digital conversion to generate a first digital signal according to the input signal;

summing the first digital signal and a digital echo cancellation signal, and generating a second digital signal according to a summation result;

obtaining a ratio of an energy of a first frequency of the second digital signal and an energy of a second frequency of the second digital signal; and estimating the channel length according to the ratio.

12. The channel estimation method of claim 11, further comprising:
generating a digital crosstalk cancellation signal according to the second digital signal, wherein the step of summing the first digital signal and the digital echo cancellation signal comprises summing the first digital signal, the digital echo cancellation signal, and the digital crosstalk cancellation signal to generate the second digital signal.

13. The channel estimation method of claim 12, further comprising:
using a plurality of first equalizer coefficients to equalize the second digital signal to generate a third digital signal;
providing a digital gain value to the third digital signal to generate a fourth digital signal;
summing the fourth digital signal and a return signal to generate a fifth digital signal;
using a decision unit to perform a determination on the fifth signal to generate an output signal; and
using a plurality of second equalizer coefficients to equalize the output signal to generate the return signal; and
setting the digital gain value according to the estimated channel length.

14. The channel estimation method of claim 13, further comprising:
setting the plurality of first equalizer coefficients and the plurality of second equalizer coefficients according to the ratio.

15. The channel estimation method of claim 11, further comprising:
generate an analog echo cancelation signal and an analog crosstalk cancelation signal;
summing the input signal, the analog echo cancelation signal, and the analog crosstalk cancelation signal to generate a first analog signal; and
providing an analog gain value to the first analog signal to generate a second analog signal,
wherein the step of performing the analog-to-digital conversion according to the input signal to generate the first digital signal comprises performing the analog-to-digital conversion to the second analog signal to generate the first digital signal.

16. The channel estimation method of claim 15, further comprising:
adjusting the analog gain value according to the ratio.

17. The channel estimation method of claim 11, wherein the step of performing the analog-to-digital conversion according to the input signal to generate the first digital signal comprises:
performing the analog-to-digital conversion according to the input signal in a first sampling phase to generate the first digital signal in the first sampling phase; and
performing the analog-to-digital conversion to the input signal in a second sampling phase different from the first sampling phase to generate the first digital signal in the second sampling phase;

the step of summing the first digital signal and the digital echo cancellation signal and generating the second digital signal according to the summation result comprises:
summing the first digital signal in the first sampling phase and the digital echo cancellation signal and generating the second digital signal in the first sampling phase according to the summation result; and
summing the first digital signal in the second sampling phase and the digital echo cancellation signal, and generating the second digital signal in the second sampling phase according to the summation result;
the step of obtaining the ratio of the energy of the first frequency of the second digital signal and the energy of the second frequency of the second digital signal comprises:
obtaining the ratio in the first sampling phase according to the energy of the first frequency of the second digital signal and the energy of the second frequency of the second digital signal in the first sampling phase; and
obtaining the ratio in the second sampling phase according to the energy of the first frequency of the second digital signal and the energy of the second frequency of the second digital signal in the second sampling phase; and
the step of estimating the channel length according to the ratio comprises:
estimating a first channel length according to the ratio in the first sampling phase;
estimating a second channel length according to the ratio in the second sampling phase; and
summing and averaging the first channel length and the second channel length to generate the estimated channel length.

18. The channel estimation method of claim 11, further comprising:
adjusting a plurality of filtering coefficients; and
using the plurality of filtering coefficients to filter a transmission signal to generate the digital echo cancellation signal.

19. The channel estimation method of claim 18, wherein in the step of adjusting the plurality of filtering coefficients, at least one filtering coefficient of the plurality of filtering coefficients is disabled.

20. The channel estimation method of claim 11, wherein the step of obtaining the ratio of the energy of the first frequency of the second digital signal and the energy of the second frequency of the second digital signal comprises:
obtaining a square value of the energy of the first frequency of the second digital signal and the square value of the energy of the second frequency of the second digital signal; and
obtaining the ratio according to the square value of the energy of the first frequency and the square value of the energy of the second frequency,
wherein the first frequency and the second frequency are respectively 1/X time the Baud rate and 1/Y time the Baud rate on the channel, wherein X and Y are respectively powers of 2, and X and Y are different.

* * * * *